US005647455A

United States Patent [19]

Russell

[11] Patent Number: 5,647,455
[45] Date of Patent: Jul. 15, 1997

[54] FOLDING SAWHORSE

[76] Inventor: Douglas L. Russell, 5336 Neilsen Ave., Ferndale, Wash. 98248

[21] Appl. No.: 430,588

[22] Filed: Apr. 28, 1995

[51] Int. Cl.[6] .................... F16M 11/00
[52] U.S. Cl. .................... 182/153; 182/225
[58] Field of Search .................... 182/153, 155, 182/181–186, 224–227

[56] References Cited

U.S. PATENT DOCUMENTS

| | | | |
|---|---|---|---|
| D. 192,700 | 5/1962 | O'Connor | 182/181 |
| 2,900,158 | 8/1959 | Differ | 182/153 |
| 3,286,752 | 11/1966 | Duryee | 248/974 |
| 4,502,563 | 3/1985 | Pershon | 182/153 |
| 5,419,409 | 5/1995 | Corgella | 182/174 |

FOREIGN PATENT DOCUMENTS

| | | | |
|---|---|---|---|
| 252410 | 10/1962 | Australia | 182/181 |

*Primary Examiner*—Alvin C. Chin-Shue
*Attorney, Agent, or Firm*—Michael R. Schacht; Hughes, Multer & Schacht, P.S.

[57] ABSTRACT

A foldable sawhorse comprising first and second leg structures each having a hinge member integrally formed therewith. One of these hinge members is an outer hinge member having a passageway extending therethrough. The other hinge member is an inner hinge member adapted to extend through the passageway in a way that allows the leg structures to rotate relative to each other about a pivot axis. An engaging member is attached to the outer hinge member such that, when the sawhorse is in use, the engaging member is appropriate for engaging a workpiece or other surface to be supported. The hinge members as described above engage each other in a manner that creates a very strong and durable pivot or hinge mechanism. Locking assemblies are employed to fix the sawhorse in an open configuration and allow it to be closed into a closed configuration for storage.

12 Claims, 3 Drawing Sheets

FOLDING SAWHORSE

TECHNICAL FIELD

The present invention relates to sawhorses for supporting a workpiece and, more particularly, to sawhorses that fold for storage and transportation.

BACKGROUND OF THE INVENTION

Sawhorses have long been used in the industry to support a workpiece or work surface. Sawhorses generally come in pairs, with one of the two sawhorses supporting one end of the supported member and the other sawhorse supporting the other end of this member.

Sawhorses used in construction will generally comprise an uppermost engaging surface made out of wood. Wood is employed because the user will often cut the workpiece supported thereby with an electric saw or the like, and such saws may penetrate the workpiece and cut into the engaging member of the sawhorse. By making this engaging member out of wood, damage to the tool being used is substantially reduced.

The most common type of sawhorse available is formed out of five separate pieces of wood, usually in standard 2×4s dimensions, that are joined by metal brackets. The end user will simply purchase the brackets and cut 2×4s to form four legs and the engaging member described above.

Numerous other variations on the basic sawhorse are known. In particular, the brackets employed to attach the leg members to the engaging member often incorporate hinges to allow the leg members to be collapsed into a closed position for storage. These hinges generally constitute a weak point in the design of the sawhorse, resulting in the sawhorse forming an unstable work surface and not being very durable. The need thus exists for a folding sawhorse that provides a stable support for a workpiece and which is durable in use.

OBJECTS OF THE INVENTION

From the foregoing, it should be clear that one primary object of the invention is to provide improved methods and devices for supporting workpieces.

Another more specific object of the present invention is to obtain methods and apparatus for supporting a workpiece or work surface that exhibit a favorable mix of the following characteristics:

(a) spaces an engaging member from the ground in a stable manner;

(b) can collapse when not in use for storage;

(c) is easily moved between the collapsed and open positions;

(d) has high load-bearing capacity;

(e) is durable and rugged in operation; and (f) is relatively inexpensive to manufacture.

SUMMARY OF THE INVENTION

These and other objects are obtained by the present invention which basically comprises a folding sawhorse in which a hinge portion thereof is formed by two elongate tubular members, one nested inside the other. The legs are attached to these tubular members such that rotation of the inner tubular member relative to the outer tubular member causes the legs to move between opened and closed positions. A hinge mechanism formed in this manner is very durable, and has high load-bearing capacity.

An engaging member, normally formed out of wood or other material which will not damage tools used in conjunction with the sawhorse, is attached to the outer tubular member. This engaging member is oriented relative to the outer tubular member and the legs attached thereto such than an upper surface thereof is substantially horizontal when the sawhorse is in the open position.

Additionally, locking assemblies are employed between opposing legs on each end to allow these legs to be locked into the open position.

In a preferred form, the inner tubular member is longer than the outer tubular member. Two of the legs on one side of the sawhorse are attached to the ends of the inner tubular member such that the outer tubular member is arranged between these legs. The other two legs on the other side of the sawhorse are attached to the ends of the outer tubular member. In this manner, when the sawhorse is in the collapsed position, all four legs may be arranged in substantially the same plane to reduce the storage space required. Also, this arrangement allows two sawhorses in the open position to be placed right next to each other with the outer legs of one sawhorse straddling the inner legs of the other sawhorse.

In use, the sawhorse will normally start in the closed position. The user need only grab the engaging member and twist it such that the legs attached to the outer tubular member are rotated away from the legs attached to the inner tubular member. When the legs reach the open position, the locking assemblies will snap into place and lock the legs into the open position. This allows the sawhorse to be placed into the open position using only one hand, which is of great value in a work environment as the other hand may often be occupied with tools, tool boxes, and the like.

Additionally, to improve the load-bearing capacity of the sawhorse, spacing members may be provided which extend between the legs on one side of the sawhorse. In particular, a spacing member may be attached to the lower ends of the two legs attached to the inner tubular member, and another spacing member may be attached to the lower ends of the two legs attached to the outer tubular member. With this arrangement, the legs will not all lie in exactly the same plane when the sawhorse is in the closed position, but they will still take up very little room. Other advantages of the present invention will become apparent from the following detailed discussion.

DETAILED DESCRIPTION OF THE INVENTION

Figure 1:
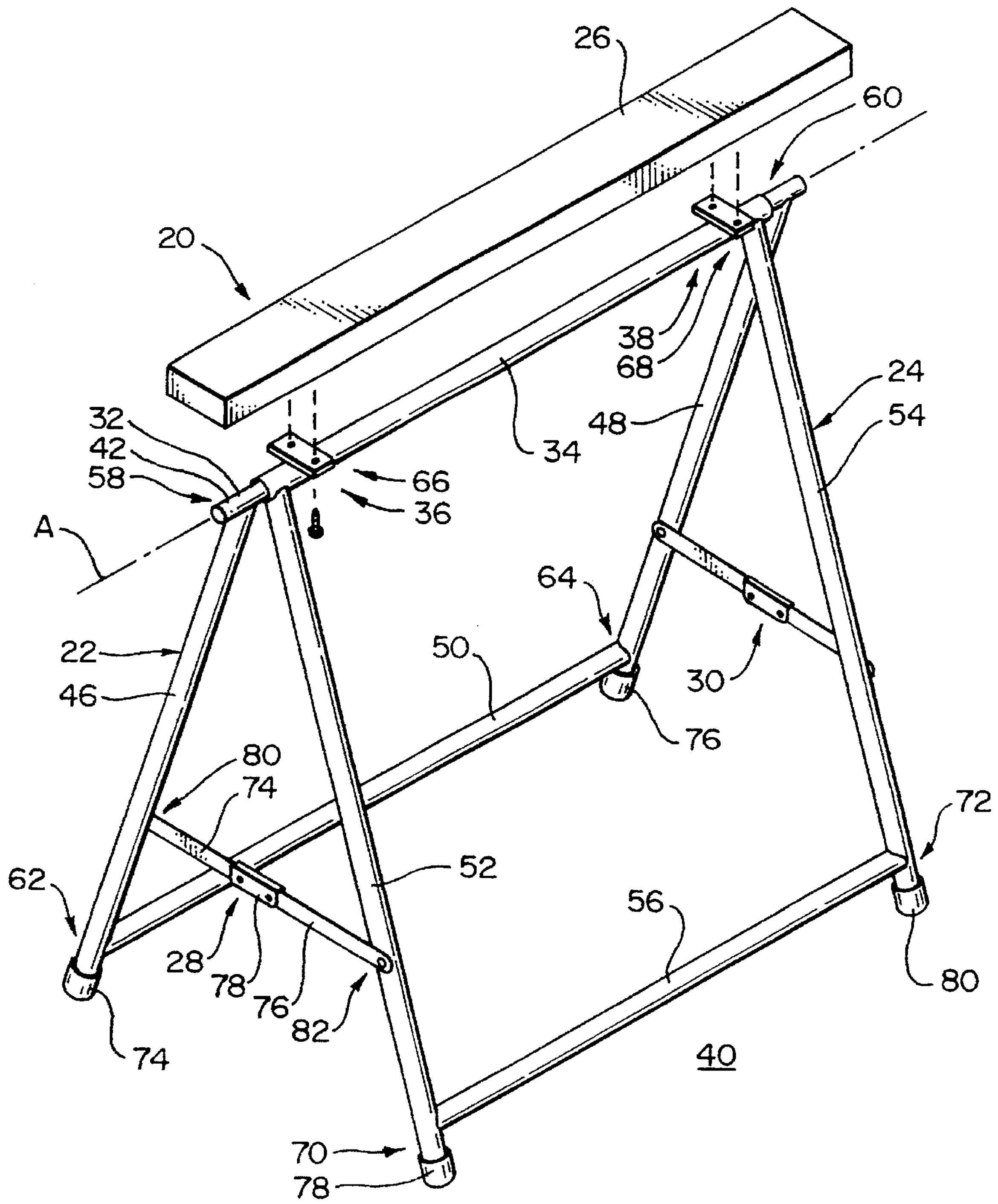
FIG. 1 is a perspective, partial exploded view of a sawhorse embodying the principles of the present invention.
Figure 2:
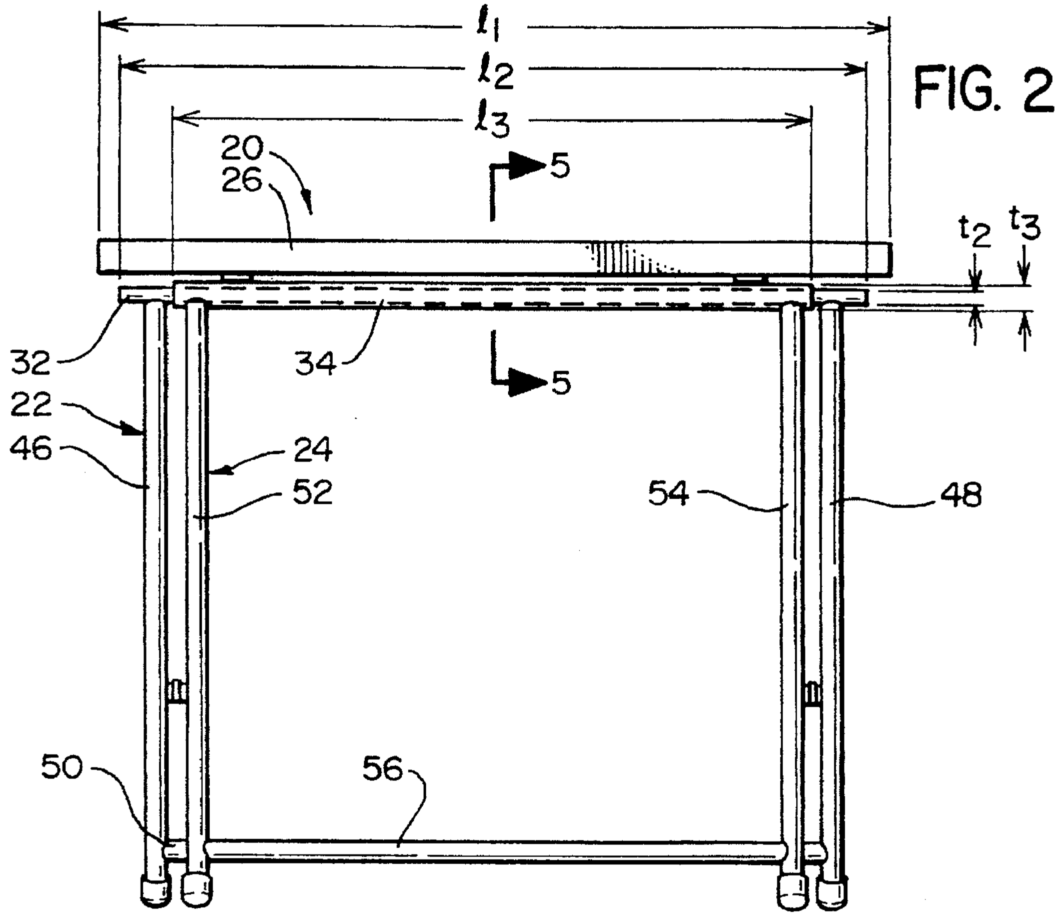
FIG. 2 is a side elevational view of the sawhorse depicted in FIG. 1.

Referring now to the drawing, depicted therein at FIG. 1 is an exemplary sawhorse 20 constructed in accordance with, and embodying, the principles of the present invention. This sawhorse 20 comprises a first leg structure 22, a second leg structure 24, an engaging member 26, and first and second locking assemblies 28 and 30. The first leg structure 22 comprises an inner hinge member 32, while the second leg structure 24 comprises an outer hinge member 34.

The sawhorse 20 is constructed such that the inner hinge member 32 is nested within the outer hinge member 34 in a manner that allows the first and second leg structures 22 and 24 to rotate relative to each other about a pivot axis A. The locking assemblies 28 and 30 extend between the leg structures 22 and 24 and move between a locked position in which the leg structures are in an open configuration as shown in FIG. 1 and an unlocked position in which the leg members are free to rotate towards each other from the open configuration. The engaging member 26 is attached to the outer hinge member 34 by first and second attachment assemblies 36 and 38.

When in the open configuration shown in FIG. 1, the first and second leg structures 22 and 24 engage the ground or floor 40 to space the engaging member 26 from the ground or floor 40. The engaging member 26 thus forms a stable support surface for a workpiece, platform, or other member.

As discussed briefly above, the inner hinge member 32 is nested within the outer hinge member 34. The outer hinge member 34 is formed by a hollow, cylindrical tube or the like made out of substantially rigid material such as steel, plastic, or the like (see Table 2 below). The inner hinge member 32 is also generally cylindrical and has an outer diameter that is slightly smaller than the inner diameter of the outer hinge member 34.

Figure 5:
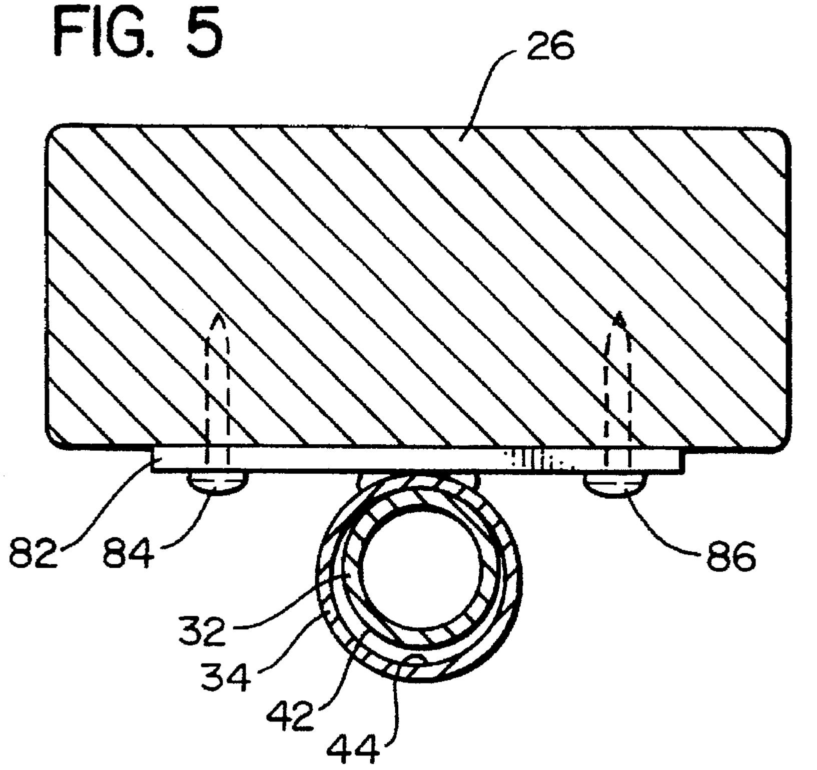
FIG. 5 is a section view taken along lines 5—5 in FIG. 2 showing details of the tubular members which form a hinge portion of the sawhorse and the method by which an engaging member is attached to the sawhorse.

As perhaps best shown in FIG. 5, in use an outer surface 42 of the inner hinge member 32 engages an inner surface 44 of the outer hinge member 34. By this means, loads are transferred from the engaging member 26 through the attachment assemblies 36 and 38, through the outer hinge member 34 and to the inner hinge member 32 and thus the first leg structure 22. Additionally, as the inner hinge member 32 engages the outer hinge member 34 along the entire length of this member 34, the loads transferred between the hinge members 32 and 34 are borne across a relatively large area. Further, given the inherent rigidity provided by the cylindrical hinge members 32 and 34, the hinge function performed by these members 32 and 34 is very stable and durable.

Figure 3:
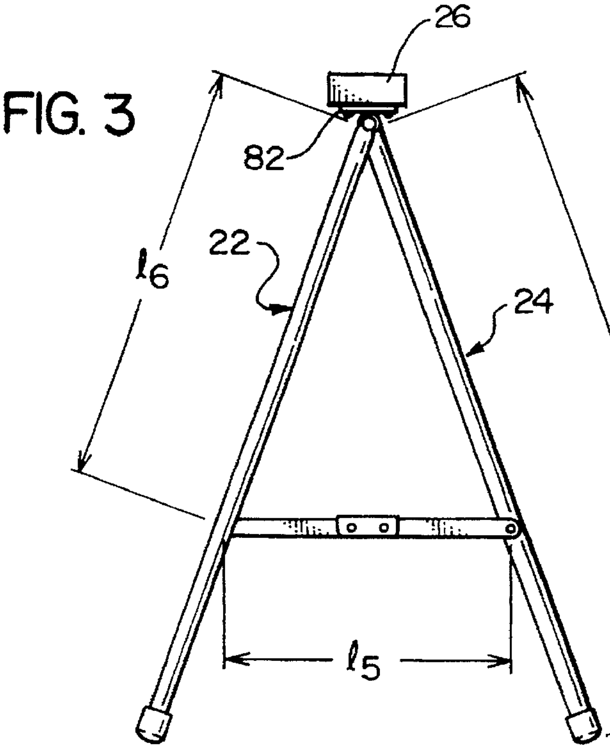
FIG. 3 is an end view showing the sawhorse of FIGS. 1 and 2 in the open position.
Figure 4:
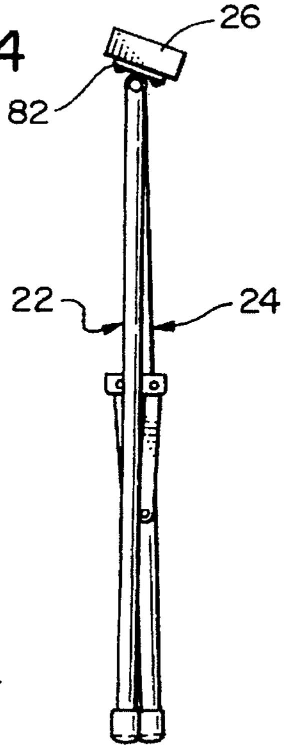
FIG. 4 is an end view of the sawhorse shown in FIGS. 1 and 2 shown in a closed position.

Referring now to FIGS. 3 and 4, it can be seen that the engagement of the inner hinge member 32 with the outer hinge member 34 allows the leg structures 22 and 24 to rotate between an open configuration (FIG. 3) and a closed configuration (FIG. 4). It should be noted that hinge members 32 and 34 need not be cylindrical, and the inner hinge member 32 need not be hollow, to perform the function as described with reference to FIGS. 3, 4, and 5. To the contrary, the sawhorse 20 would function basically as described with other cross-section configurations such as rectangular, ovoid, triangular, etc. However, the cylindrical configuration shown in the drawings is preferred as this configuration will provide the least amount of resistance to the rotation of the inner hinge member 32 relative to the outer hinge member 34 and can be formed of readily available parts.

Referring now back to FIG. 1 for a moment, the construction and operation of the sawhorse 20 will be described in further detail. Referring initially to the first leg structure 22, FIG. 1 shows that, in addition to the inner hinge member 32, the structure 22 comprises a first leg member 46, a second leg member 48, and a spacing member 50. Similarly, the second leg structure 24 comprises a first leg member 52, a second leg member 54, and a spacing member 56.

FIG. 1 also shows that the inner hinge member 32 forming a part of the first leg structure 22 is longer than the outer hinge member 34 forming a part of the second leg structure 24. The first leg member 46 of the first leg structure 22 is securely attached to a first end 58 of the inner hinge member 32. This attachment is preferably formed by welding or the like, but may be formed by a mechanical structure such as a bolt or a chemical structure as an adhesive.

The second leg member 48 of the leg structure 22 is similarly attached to a second end 60 of the inner hinge member 32. The spacing member 50 is connected between lower ends 62 and 64 of the first and second leg members 46 and 48.

During assembly of the first leg structure 22, the outer hinge member 32 is first placed over the inner hinge member 42 such that, when the leg members 46 and 48 are attached to the hinge member 32, the outer hinge member 34 is arranged around the inner hinge member 32 and between the leg members 46 and 48. The outer hinge member 34 thus may not be removed from the inner hinge member 32 without removing at least one of the legs 46 and 48 therefrom.

Although not necessary, production and use of the sawhorse 20 is simplified if the inner hinge member 32 is parallel to the spacing member 50, the leg members 46 and 48 are parallel, and the leg members 46 and 48 extend at a right angle from the inner hinge member 32 and spacing member 50. The resulting leg structure 22 is generally rectangular in shape with a large opening in the middle, although other configurations such as trapezoidal may be adapted for this intended purpose.

The second leg structure 24 is similarly configured, although slightly smaller in overall size because the outer hinge member 34 is shorter than the inner hinge member 32. In particular, the first leg member 52 is connected to a first end 66 of the outer member 34, while the second leg member 54 is connected to a second end 68 of the outer hinge member 34. The spacing member 56 is connected between lower ends 70 and 72. With the first and second leg members 52 and 54, again, the exact shape of the second leg structure 24 is somewhat arbitrary, but the generally rectangular shape of the preferred sawhorse 20 simplifies manufacture and use of the sawhorse 20.

The locking assemblies 28 and 30 are identical and only the locking assembly 28 will be described herein in detail. The locking assembly 28 comprises a first rigid member 74, a second rigid member 76, and a sleeve member 78. A first end 80 of the locking assembly 28 is rotatably attached to the first leg member 46 of the first leg structure 22. A second end 82 of the locking assembly 28 is similarly rotatably attached to the first leg member 52 of the second leg structure 24.

The sleeve member 78 is pivotally attached both to the rigid member 74 and the rigid member 76 such that, when the locking assembly 28 is connected between the leg members 46 and 52, the sleeve member 78 engages the rigid members 74 and 76 to maintain the locking assembly 28 in a locked position whereby the ends 80 and 82 thereof are spaced a fixed distance apart. In this locked position, the sleeve member 78 cannot move downwardly.

However, to move the locking assembly 28 into an open position, the sleeve member 78 is raised. This allows the ends 80 and 82 of the locking assembly to move together, thereby allowing the leg members 46 and 52 connected thereto also to move together. Thus, the leg structures 22 and 24 may rotate towards each other into the closed position shown in FIG. 4. Other locking assemblies that perform the same function are well-known in the art. And, given the applicant's disclosure herein, it would be clear that other known locking assemblies may be substituted for the exemplary assemblies 28 and 30.

Referring again to FIG. 1, it can be seen that ground engaging members 74, 76, 78, and 80 are placed on the leg members 46, 48, 52, and 54, respectively. These ground engaging members 74, 76, 78, 80 are made of resilient material to prevent the rigid leg members 46, 48, 52, 54 from scratching the surface 40 on which the sawhorse 20 is placed.

Referring now to FIGS. 1 and 5, depicted therein in detail are the attachment assemblies 36 and 38 employed to fasten the engaging member 26 onto the outer hinge member 34. These attachment assemblies 36 and 38 are identical, and only the assembly 38 will be descried herein in detail.

The attachment assembly 38 basically comprises an attachment plate 82 welded or otherwise securely affixed to the outer hinge member 34. The assembly 38 further comprises screws 84 and 86 which extend through the attachment plate 82 and into the engaging member 26. This attachment assembly 38 thus allows the engaging member 26 to be securely fastened to the outer hinge member 34 but still reduces the likelihood that a tool such as a saw used in conjunction with the sawhorse 20 will become damaged.

It should be recognized that, while the exemplary sawhorse 20 employs a flat plate with screws extending therethrough to form the attachment assembly 38, given the teachings of the present application, one of ordinary skill in the art would recognize that a number of other methods may be used to fasten the engaging member 26 onto the outer hinge member 34.

These alternative methods would include a tray having peripheral flanges that extend upward along the engaging member 26, with screws horizontally extending through these flanges into the engaging member 26, a clamp assembly which does not physically penetrate the engaging member 26, forming spikes on an outer surface 88 of the outer hinge member 34 that extend into the engaging member 26 and any other arrangement by which a wooden engaging member can be attached to a member that performs the function of the outer hinge member 34.

Additionally, FIGS. 3 and 4 show that the attachment plate 82 extends at an angle relative to the plane of the second leg structure 24. This angle is determined such that the attachment plate 82 is substantially horizontal when the sawhorse 20 is in use.

Figure 6:
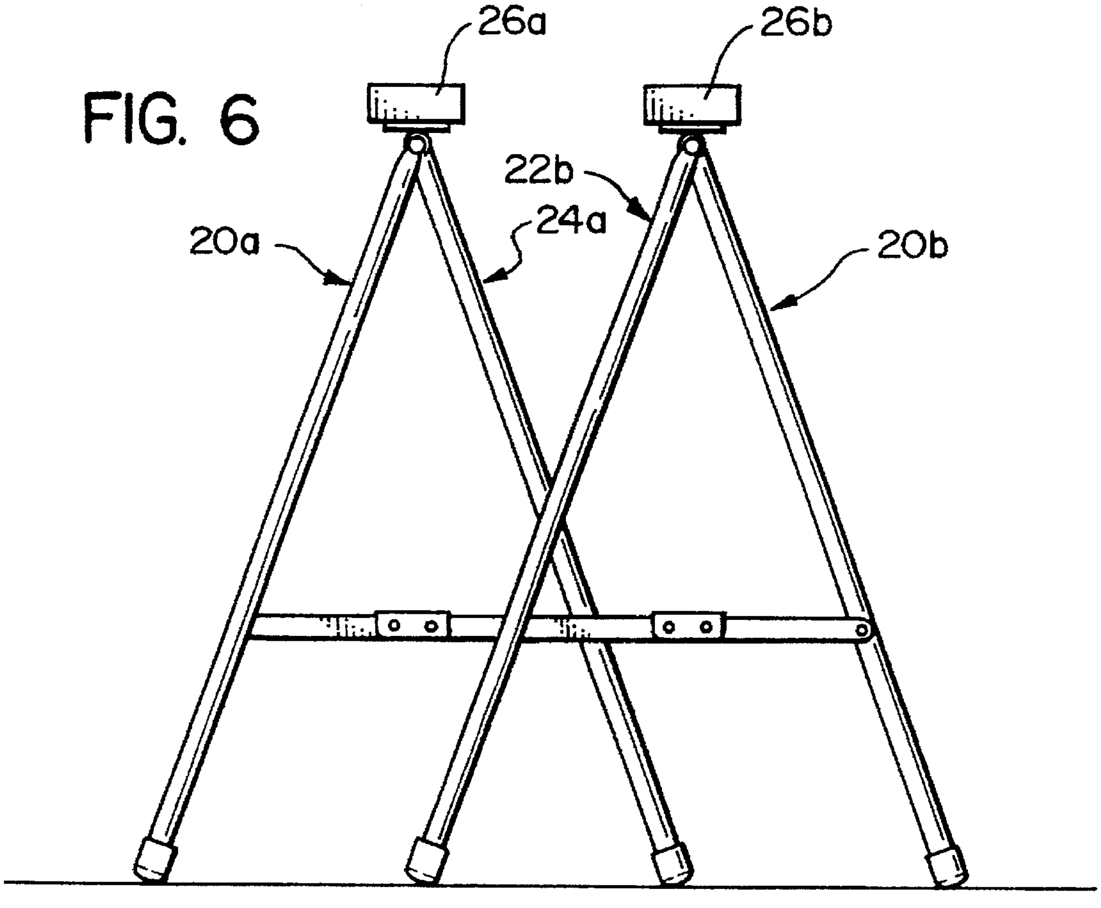
FIG. 6 is an end view of two sawhorses shown arranged adjacent to each other such that the legs of one of the sawhorses are nested within the legs of the other of the sawhorses.

Referring now to FIG. 6, depicted therein are first and second sawhorses 20a and 20b constructed in the same manner as the sawhorse 20 described above. The sawhorses 20a and 20b are shown arranged next to each other such that the second leg structure 24a of the first sawhorse 20a is nested within the first leg structure 22b of the second sawhorse 20b. This arrangement allows the engaging members 26a and 26b of the sawhorses 20a and 20b to be arranged very close to each other to accommodate very narrow or small workpieces.

Attached herewith are two tables defining certain parameters to the present invention. The first table relates to certain dimensions $l_1$ through $l_6$ and $t_1$ through $t_3$ identified in the drawings. The dimensions $l_1$ through $l_6$ are lengths of indicated components in inches, while the dimensions $t_1$ through $t_3$ are inner diameters of certain specified tubular members. Table 1 contains the actual values for the currently preferred embodiment, a first preferred range of values, and a second preferred range of values. Table 2 comprises the preferred material selected fort certain of the components identified by reference characters in the first column as well as known alternates to the preferred materials.

It should be clear from the foregoing that the present invention may be embodied in other specific forms without departing from the essential characteristics thereof. The present embodiments are therefore to be considered in all respects as illustrative and not restrictive, the scope of the invention being indicated by the appended claims rather than by the foregoing description; all changes which come within the meaning and range of equivalency of the claims are therefore intended to be embraced therein.

TABLE 1

| | PREFERRED | FIRST PREF. RANGE | SECOND PREF. RANGE |
|---|---|---|---|
| $l_1$ | 35 1/2" | 30"–40" | 24"–48" |
| $l_2$ | 34" | 28 1/2"–38 1/2" | 22 1/2"–46 1/2" |
| $l_3$ | 27 3/4" | 28"–32 1/2" | 16"–41" |
| $l_4$ | 29 7/8" | 22 1/2"–47 7/8" | 22 1/2"–55 7/8" |
| $l_5$ | 9 1/2" | 8"–10" | 8"–13 1/2" |
| $l_6$ | 14 3/4" | 12"–15" | 12"–20" |
| $t_1$ | 3/4" ID | 1/2"–1" | — |
| $t_2$ | 1/2" ID | 1/2"–1" | — |
| $t_3$ | 3/4" ID | 3/4"–1 1/4" | — |

TABLE 2

| ELEMENT | PREFERRED | ALTERNATES |
|---|---|---|
| 46–56 | 18 gauge EMT | 18 gauge steel tube; 16 gauge steel tube; structural steel square tube |
| 34 | 18 gauge EMT | 18 gauge steel tube; 16 gauge steel tube; structural steel square tube |
| 32 | 18 gauge EMT | 18 gauge steel through schedule 40 pipe according to AISC specification manual; structural steel square tube |
| 74–80 | polypropylene plastic | gum rubber |

I claim:

1. A folding sawhorse having a support surface for supporting a workpiece comprising:
   - an inner rigid structure comprising an inner hinge member and a first leg structure;
   - an outer rigid structure comprising an outer hinge member and a second leg structure, where the outer hinge member comprises a hollow metal pipe and the inner hinge member extends through the outer hinge member in a manner that allows the second leg structure to rotate relative to the first leg structure between a folded position and a support position;
   - a wooden support member on which the support surface is formed;
   - at least one flat mounting plate welded to the outer hinge member for supporting the support member, where the mounting plate is attached to the outer hinge member such that portions of the mounting plate outwardly extend to either side of the outer hinge member, and the mounting plate is angled with respect to the second leg structure such that, when the wooden support member is supported by the mounting plate, the support surface is in a desired orientation when the second leg structure; is in the support position relative to the first leg structure;

attachment means for rigidly attaching the support member to the mounting plate means, the attachment means comprising fasteners extending through the outwardly extending portions of the mounting plate and only partially into the wooden support member to attach the wooden support member to the mounting plate; and locking means for selectively locking the second leg structure in the support position relative to the first leg structure; wherein the wooden support member spaces the support surface from the outer hinge member to reduce the likelihood that tools working on the workpiece will engage the outer hinge member.

2. A folding sawhorse as recited in claim 1, in which the support surface is substantially horizontal in the desired orientation.

3. A folding sawhorse as recited in claim 1, comprising:

first and second mounting plates welded to the outer hinge member; and the attachment means comprises a plurality of fasteners that extend through the first and second mounting plates and only partially into the wooden support member.

4. A folding sawhorse as recited in claim 3, in which the the attachment means comprises a plurality of screws.

5. A folding sawhorse as recited in claim 4, in which the first and second leg structures each comprise a first leg member, a second leg member, and a spacing member.

6. A folding sawhorse as recited in claim 5, in which:

the first hinge member is longer than the second hinge member; and the first and second leg members of the first leg structure are attached to the first hinge member on opposite sides of the second hinge member.

7. A folding sawhorse as recited in claim 1, in which the locking means comprises a folding brace assembly having a first end connected to the first leg structure and a second end connected to the second leg structure, where the folding brace assembly is movable between a locked position in which the second leg structure is in the support position and an unlocked position in which the second leg structure can move between the support position and the folded position.

8. A folding sawhorse as recited in claim 7, in which the first end of the folding brace assembly is connected to an inside portion of the first leg structure and the second end of the folding brace assembly is connected an outside portion of the second leg structure.

9. A folding sawhorse as recited in claim 8, in which:

the first and second leg structures each comprise a first leg member, a second leg member, and a spacing member;

the locking means extends between corresponding leg members of the first and second leg structures.

10. A folding sawhorse as recited in claim 7, in which the locking means comprises:

a first brace member having an inner end and an outer end, the outer end of the first brace member forming the first end of the folding brace assembly;

a second brace member having an inner end and an outer end, the outer end of the second brace member forming the second end of the folding brace assembly;

a sleeve member; and fastening means for pivotally fastening the inner ends of the first and second brace members to the sleeve member; wherein the sleeve member engages the first and second brace members to place the folding brace assembly in its locked position.

11. A folding sawhorse as recited in claim 5, in which the spacing member is connected between lower ends of the first and second leg members of each of the first and second leg structures.

12. A folding sawhorse as recited in claim 9, in which the spacing member is connected between lower ends of the first and second leg members of each of the first and second leg structures.

* * * * *